United States Patent [19]

Cesare et al.

[11] Patent Number: 4,888,393

[45] Date of Patent: Dec. 19, 1989

[54] CARBOXYL MODIFIED OLEFINIC COPOLYMER COMPOSITIONS

[75] Inventors: Frank C. Cesare; William P. Whelan, Jr., both of Woodbury; Henno A. Petersen, Sandy Hook, all of Conn.; Thomas S. Coolbaugh, Arlington, Mass.; Robert G. Davis, Naugatuck, Conn.

[73] Assignee: Uniroyal Chemical Company, Inc., Middlebury, Conn.

[21] Appl. No.: 196,162

[22] Filed: May 19, 1988

Related U.S. Application Data

[62] Division of Ser. No. 606, Jan. 5, 1987, Pat. No. 4,767,806.

[51] Int. Cl.$^4$ .................. C08F 255/04; C08F 255/06; C08F 255/02

[52] U.S. Cl. .................................. 525/285; 525/301; 526/272; 526/318.25; 526/318.6; 562/590; 562/595; 562/598

[58] Field of Search .............................. 525/285, 301; 526/318.25, 318.6, 272; 260/546; 562/590, 595, 598

[56] References Cited

U.S. PATENT DOCUMENTS

| | | | |
|---|---|---|---|
| 3,819,592 | 6/1979 | Visser | 260/80 |
| 3,896,094 | 7/1975 | Visser | 260/80 |
| 3,896,096 | 7/1975 | Visser | 260/80 |
| 4,071,581 | 1/1978 | Yokoyama | 562/595 |
| 4,161,452 | 7/1974 | Stanbaugh | 525/285 |
| 4,358,564 | 11/1982 | Ames | 525/285 |

FOREIGN PATENT DOCUMENTS 0183493 6/1986 European Pat. Off.

*Primary Examiner*—Patricia Short
*Attorney, Agent, or Firm*—Glenn E. Karta

[57] ABSTRACT

The invention relates to a novel low profile additive (LPA) for uncured polyester resins and the resultant molding compositions. The low profile additive is the reaction product of an ethylene/alphaolefin copolymer with a carboxylic acid or anhydride, to thereby form a non-thermoplastic carboxyl modified polyolefin. The novel LPA is a remarkably effective dimensional stabilizer and has displayed the ability to achieve net expansion in a cured polyester resin molding composition.

10 Claims, No Drawings

CARBOXYL MODIFIED OLEFINIC COPOLYMER COMPOSITIONS

This is a division of application Ser. No. 000,606 filed Jan. 5, 1987, now U.S. Pat. No. 4,767,806.

BACKGROUND OF THE INVENTION

This invention relates to carboxyl modified olefinic copolymer compositions which are improved additives for unsaturated polyester compositions. More specifically, the invention relates to ethylene/alphaolefin copolymers which improve the shrinkage and surface smoothness characteristics of an unsaturated resin mixture.

Molding compositions formulated of curable or thermosetting unsaturated polyester resins have enjoyed widespead use, specifically for making fiber reinforced thermoset plastics. Fiber reinforced molding compositions are specifically employed to provide prepreg mats, sheet molding compounds (SMC), and bulk molding compounds (BMC) which are materials commonly used for preparing reinforced cured shaped articles by either injection molding or press molding. The molding compositions are typically mixtures of the unsaturated polyester resins, fillers, fiber reinforcers, initiators, thermoplastic polymers and other minor additives such as mold release agents, thickeners, and pigments.

A continuous problem area in the thermosetting polyester resin art has been encountered in the curing step of the unsaturated polyester resin composition. When cured in a condensation solution or dispersion of an unsaturated monomer solvent, such as styrene, the molded product has a tendency to shrink and crack, as well as a propensity to have a dull surface. The shrinkage problem is particularly acute when the cured resin has fiber reinforcement. In this case the shrinkage of the curing resin produces an imprint of the fiber on the surface of the molded article with resulting detrimental effects to the surface smoothness of the formed article. In this regard, the use of low profile additives or thermoplastic polymers has been a significant contribution to the commercialization of polyester molding compositions by improving the surface effects and dimensional stability of the cured products.

Curing of the molding compositions (e.g., SMC and BMC) generally takes place at elevated temperatures. Generally, the shrinkage reduction effect of the low profile additive is attributed to the fact that the low profile additive (LPA) or thermoplastic polymer becomes less soluble in the resin at elevated temperatures, causing a partial phase separation. A two-phase mixture results with the curing polyester resin constituting the continuous phase and the thermoplastic or low profile additive constituting the distributed phase. The discontinuous phase thermoplastic polymer within the composite has been found to decrease the amount of shrinkage that occurs upon curing of the composite. It is generally observed that the greater the thermoplastic polymer content the greater the shrinkage reduction effect of the thermoplastic resin or low profile additive.

Many attempts have been made in the art to improve the surface characteristics of unsaturated polyester resins. One is disclosed in U.S. Pat. No. 4,100,224. This patent proposes the use of thermoplastic polymers, and specifically discusses a thermoplastic graft elastomer which is the reaction product of a styrene copolymer and monomers such as styrene or acrylonitrile. Although this composition decreases shrinkage, the reduction is marginal.

The use of ethylene/propylene copolymers and terpolymers in various forms, in unsaturated polyester molding compositions, has been recognized, for example, in U.S. Pat. No. 4,100,224 discussed above and in U.S. Pat. Nos. 3,880,950; 4,258,143; 4,299,927. U.S. Pat. No. 3,880,950 discusses the use of a microgel polymer in conjunction with a thermoplastic polymer in a polyester resin composition. Either or both of the microgel polymer or the thermoplastic polymer may contain carboxyl groups. The preferred microgel polymer includes a copolymerization product of alpha, beta unsaturated carboxylic acids with at least one of styrene, methyl methacrylate and acrylonitrile in the presence of polybutadiene or polyisoprene. The microgel polymer is described as having 0.1–10% by weight carboxyl groups.

U.S. Pat. Nos. 4,258,143 and 4,299,927 disclose thermoplastic low profile additives of a carboxyl modified polyolefin. Specifically exemplified are the homopolymers polyethylene, polypropylene and polybutylene. Generally, a wide range of thermoplastic homo- and copolymers are discussed including ethylene/alphaolefin copolymers. The copolymer and homopolymer compositions are described as having a melt viscosity of 100–40,000 at 175° C. The lowest percentage shrinkage obtained by the use of the polyolefin modifier disclosed was 2.88% as compared to a 3.5% shrinkage in a control polyester without a thermoplastic polymer modifier.

Although various thermoplastic resins have been proposed in the art, the search still continues for improved low profile additives. Therefore, even though low profile additives are generally known, and specifically, they are known for their reduction of shrinkage in curing compositions, there still remains considerable room for improvement in terms of both shrinkage control and improvement in surface characteristics of the final molded article formed from molding compositions containing low profile additives.

SUMMARY OF THE INVENTION

Accordingly, an object of this invention is to provide improved low profile additives for use in unsaturated polyester molding compositions which will improve their ability to resist shrinkage. This invention is directed to the discovery that non-thermoplastic polymers are particularly well suited as low profile additives. Particularly in accordance with this objective, it has been discovered that certain carboxyl modified ethylene/alphaolefin/ (optionally) nonconjugated diene copolymers and terpolymers are particularly well suited for use as low profile additives. It has been found that non-thermoplastic low profile additives, in accordance with the invention, provide dramatic control of curing shrinkage which results in exceptionally smooth surfaces in a molded thermoset mixture. The non-thermoplastic carboxyl modified ethylene/alpha olefin is suitably formed from a precursor ethylene/alphaolefin as described in our U.S. Pat. No. 4,668,834, filed Oct. 16, 1985, the disclosure of which is incorporated herein by reference. The ethylene/alphaolefin is suitably modified by a carboxyl group in the presence of a free radical initiator. These particular carboxyl modified ethylene/alphaolefin copolymers are not thermoplastics and have been found to provide dramatic control of shrinkage and surface smoothness in the molded product. In fact, by the use of non-thermoplastic polymers it has been shown that net expansion of the cured molded part is possible when measured after cooling relative to the cold mold cavity. Net expansion of the cooled molded part is extremely desirable and a considerable improvement in terms of the commercial potential of unsaturated polyester molding compositions. Generally, the art has been limited to a mere decrease in the degree of shrinkage.

DETAILED DESCRIPTION OF THE PREFERRED EMBODIMENTS

Thus, the present invention relates to a novel low profile additive (LPA) for uncured polyester resins and their molding compositions. The low profile additive is the reaction product of an ethylene/alphaolefin with carboxylic acids or anhydrides to form a non-thermoplastic carboxyl modified polyolefin. The novel LPA is a remarkably effective dimensional stabilizer and has displayed the ability to obtain net expansion in a cured polyester resin molding composition.

The non-thermoplastic polymers according to the invention are preferably liquid at ambient conditions. The polymers are of relatively low molecular weights and desirably have low chain branching and low crystallinity. The polymerization of these non-thermoplastic polymers can occur in the presence of hydrogen to lower polymer molecular weight.

The specific ethylene/alphaolefin copolymers to be modified by carboxyl groups as contemplated by the present invention comprise alphaolefins having a formula $H_2C=CHR$ wherein R is a hydrocarbon radical comprising 1 to 10 carbon atoms. The copolymer optionally can contain a nonconjugated polyene to form a terpolymer.

The alphaolefins, which may be employed in the practices of this invention, are preferably compounds of the formula $CH_2=CHR$ wherein R is an alkyl radical containing from 1 to 10 carbon atoms. When R contains more than 2 carbon atoms, such radical may be straight chain or branched. Most preferred alphaolefins include propylene, 1-butene, 1-pentene, 1-hexene, 3-methyl pentene, 1-heptene, 1-octene and 1-decene.

The polyenes which may be employed in the practice of this invention are nonconjugated. Illustrative nonconjugated polyenes are aliphatic dienes such as 1,4-hexadiene, 1,5-hexadiene, 1,4-pentadiene, 2-methyl-1,4-pentadiene, 3-methyl-1,4-hexadiene, 4-methyl-1,3-hexadiene, 1,9-decadiene, exo and endo-dicyclopentadiene and the like; exo- and endo- alkenylnorbornenes, such as 5-propenyl-, 5-(buten-2-yl)-; and 5-(2-methylbuten-[2']-yl)norbornene and the like; alkylalkenylnorbornenes, such as 5-methyl-6-propenylnorbornene and the like; alkylidenenorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propylnorbornadiene and the like; and cyclodienes such as 1,5-cyclooctadiene, 1,4-cyclooctadiene and the like.

The ethylene content of the copolymers of this invention is generally in the range of between about 30 and 70%, and is preferably between about 35 and 65%, and is most preferably between about 40 and 60% by weight. When present, nonconjugated polyene weight percent generally ranges between 0% and about 25%, is preferably between about 2 and 20%, and is most preferably between about 4 and 17%. The remaining weight percent of such copolymers (up to 100%) is comprised of alpha olefin.

The copolymers of this invention generally possess a number average molecular weight of between about 250 and 15,000, preferably between about 1,000 and 12,000, most preferably between about 3,000 and 10,000. Consequently, such copolymers generally possess an intrinsic viscosity (as measured in tetralin at 135° C.) between about 0.025 and 0.55 dl/g, preferably between about 0.075 and about 0.45 dl/g, most preferably between about 0.2 and about 0.4 dl/g. However, these viscosity values are in no sense necessary for obtaining a non-thermoplastic copolymer according to the invention.

The non-thermoplastic copolymer of this invention, when of the type described in our copending application referred to previously, is preferably further characterized in that it may optionally possess vinylidene termination unsaturation. Thus, one end of such polymer will be of the formula $P-CR=CH_2$ wherein R is as defined above (with respect to the alphaolefins which may be employed) and P represents the polymer chain. Preferably, at least about 50% of the copolymer chains possess vinylidene terminal unsaturation. More preferably, at least 60% of such chains are vinylidene terminated, while most preferbly at least 75% of such polymer chains exhibit vinylidene terminal groups. The percentage of vinylidene termination can be determined by spectrographic analysis.

Preparation of the copolymers described above is disclosed in U.S. Pat. Nos. 3,819,592; 3,896,094; and 3,896,096 and U.S. Pat. No. 4,668,834, all of which are incorporated by reference. The copolymers and terpolymers are further reacted with unsaturated or saturated carboxylic acids or anhydrides of aliphatic or aromatic type, which generally contain three or more carbon atoms and one or more carboxylic acid or anhydride groups per molecule. Exemplary acids include maleic acids, mesaconic acid, chloromaleic acid, itaconic acid, citraconic acid, glutaric acid, adipic acid, sebacic acid, pimelic acid, orthophthalic acid, isophthalic acid, terephthalic acid, acrylic acid and methacrylic acid. Also suitable are anhydrides of the above acids, for example, the anhydrides derived from maleic, succinic, orthophthalic or other mono or di-carboxylic acids. Also suitable, in certain instances, are higher molecular weight organic compounds containing carboxylic or dicarboxylic acid groups or the corresponding anhydrides thereof, for example, 5-(2,5-dioxotetrahydrofuryl)-3-methyl-3-cyclohexene-1,2-dicarboxylic anhydride or glycerol acetate bistrimellitate dianhydride or 3,3',4,4'-benzophenone tetracarboxylic dianhydride, or pyromellitic dianhydride, among others.

The ethylene/alphaolefin copolymer is preferably reacted with the carboxylic acid or anhydride with a free radical initiator. Suitable free radical initiators which can be used for carrying out the carboxyl modification of the olefinic copolymer or terpolymer include organic peroxides with a half life of approximately ½ to 2 hours at a temperature of 70° to 160° C. Some examples of such peroxides are di-t-butyl peroxide, dicumyl peroxide and benzoyl peroxide. Also suitable are peroxyesters such as t-butyl perbenzoate, t-butyl peroxypivalate, 2,5-dimethylhexyl-2,5-di(perbenzoate), and so forth. This list is in no way considered exhaustive and any free radical initiator which possesses the required half life at the temperature of the reaction will be suitable for purposes of this invention. It would also be possible to carry out the reaction by means of free radicals generated by thermal or radiation sources such as ultraviolet light.

The carboxyl modified olefin copolymers in accordance with the invention can be prepared in any suitable reaction vessel, such as a resin kettle or pressure reactor which is charged with an olefinic copolymer, together with the carboxylic acid or anhydride, and a suitable free radical initiator. The temperature of the reaction is normally within the range of 70° C. to 160° C. The reaction may be carried out in the presence of an inert solvent such as cyclohexane, n-hexane, n-heptane, benzene, or xylene. Suitably inert solvents are employed if dilution or a lower viscosity of the mixture is desired. The dilution of the olefin copolymer is optional in that it is already in liquid form. However, for a more controlled reaction rate, dilution may be desirable. Furthermore, the use of lower temperatures than the abovementioned range is also optional depending on the requirements of the reaction medium. After being charged with the reagents and optionally the inert solvent, the vessel is closed, flushed with nitrogen, and the temperature of the reactor is raised to the desired value.

The contents of the vessel are continuously stirred as the reaction proceeds to completion. Typically, the reaction is completed in about three half lives of the initiator. The relative amount of the olefinic copolymer or terpolymer, carboxylic anhydride or acid and free radical initiator which could be used in carrying out the reaction to form the carboxyl modified polymer depend on factors such as the type and molecular weight of the olefin polymer, the type of carboxylic compound, the type of free radical initiator, the temperature of the reaction, the amount of carboxyl functionality desired in the reaction product, and the purity of the reagents. The determination of the reaction conditions in light of these factors would be considered an obvious expedient to one of skill in the art in veiw of the general parameters outlined above and further discussed below.

When using the reaction product in a sheet molding compound or bulk moulding compound to effect shrinkage control, it has been surprisingly found that shrinkage is minimized with an optimal molecular weight range of the carboxyl modified olefinic copolymers. This optimum molecular weight range of the modified copolymer is from about 5,000 to about 14,000 number average molecular weight. The most suitable corresponding range for the olefinic copolymer before it is modified in the carboxylic step outlined above is about 3,000 to about 10,000 number average molecular weight. Therefore, this is considered a preferred molecular weight range of the polyolefin when employed to produce the carboxyl modified copolymer of the invention.

Surprisingly, it has also been found that the shrinkage control which one obtains with the modified polyolefin copolymer, within the optimum range stated above, is not dependent upon the particular molecular weight of the starting olefinic copolymer. Generally, as long as the number average molecular weight of the carboxyl modified polyolefin copolymer is within the range stated above, the molecular weight of the unmodified olefinic copolymer is not determinitive of the degree of shrinkage control obtained. Therefore, it is feasible to prepare the desired modified copolymer from many different starting polyolefin copolymers and to tailor the reaction conditions to produce a modified copolymer within the above-stated optimum molecular weight range of the modified copolymer for best shrinkage control. This lends a great degree of flexibility to production of the low profile additive, same being dependent on the availability of reagents, relative costs of reagents, and reaction equipment and related costs.

Similarly, the optimum molecular weight range of the modified copolymer with respect to the optimum surface smoothness corresponds to the optimal molecular weight range recited above for optimum shrinkage control. Additionally, at the high portion of the optimal molecular weight range of the modified polyolefin, the cured molding composition would still have excellent surface smoothness even though the shrinkage control may have fallen off to less than that obtained in the middle portion of the optimal range.

With the above considerations in mind, the reaction conditions of the ethylene/alphaolefin copolymer with the carboxylic reagent can best be illustrated generally with respect to a specific example. Specifically, it has been found that when using an ethylene-propylene copolymer which has the most preferred number average molecular weight of between about 3,000 and 10,000, and using maleic anhydride as a carboxylic modifier and using di-t-butyl proxide as the free radical initiator, the typical reagent amounts used are: 100 parts of copolymer, approx. 1 to 10 parts of maleic anhydride and approx. 0.01 to 1 part of initiator by weight. By operating under these conditions and concentrations, the reaction products obtained have contained approximately 0.1% to 10% by weight of maleic anhydride covalently bonded to the ethylene-propylene copolymer. This carboxylic weight percentage generally represents a preferred range of carboxylic groups on the olefinic copolymer when employed as a low profile additive pursuant to the present invention. The analysis for the composition of the product was carried out by conventional analytical techniques such as titration, and infrared spectroscopic analysis. Of course, the above reaction conditions are exemplary only and other suitable reagent concentrations, reaction times, and temperatures of reaction would be readily ascertanable by one of skill in the art depending upon the reagents employed and the products desired. General considerations as to the relative proportions of the reagents and the time and the temprature of the reaction can be determined experimentally to suit the particular materials on hand as well as the desired end product. Specific general considerations would be, for example, that ethylene-propylene terpolymers normally require less initiator than ethylene-propylene copolymers, or no initiator at all. Likewise, some olefinic copolymers and carboxyl compounds may be subject to autopolymerization with heating in the presence of certain free radicals. In such cases, to minimize or avoid unwanted side reactions or cross linking, it may be desirable to reduce the temperature or time of reaction, to reduce or omit the initiator, or even to add a cross linking inhibitor such as dimethyl sulfoxide or dimethyl formamide.

Following the reaction of the copolymer to form the carboxyl modified copolymer, subsequent processing of the modified copolymer product depends upon the volatility of the possible byproducts and the degree of product purity desired. If volatile byproducts are present, the reactor is cooled to approximately 25° C. to 60° C. and the contents transferred to an open container and placed in a vacuum oven at about 100° C. for approximately 12 hours. This process removes volatile residues, solvents, etc. Alternatively, if it is known that the residues are not a problem, the product may be used directly without vacuum processing in a sheet molding or bulk molding compound recipe as described below.

If non-volatile residues are present, and it is desired to remove them, solvent extraction steps can be carried out. The solvent extraction can follow the vacuum evaporation steps outlined above to effectively recover purified modified copolymer. For example, when dicumyl peroxide is used as the initiator, the reaction products can be dissolved in a solvent such as hexane and partitioned, for example, by acetone. The by-product residues will concentrate in the acetone layer and can be decanted from the modified polyolefin which is in the hexane layer.

The modified copolymer reaction product low profile additive is preferably placed in an unsaturated solvent monomer for its further reaction with a polyester for use as a low profile additive in a SMC or BMC molding composition. Suitable monomeric liquids are copolymerizable with the unsaturated polyesters and develop therewith the crosslinked thermoset polymer. The monomeric liquid should also have the ability to dissolve the unsaturated polyester and the modified polyolefinic copolymer in accordance with the invention. Suitable monomers would include styrene, alpha-methyl styrene, alpha-ethyl styrene, ring substituted styrenes, such as alkyl styrenes, e.g., ortho-, meta- and para-alkyl styrenes, e.g., o-methyl styrene, p-ethyl styrene, meta-propyl styrene, 2,4-dimethyl styrene, 2,5-diethyl styrene, and the like, halostyrenes, e.g., o-bromostyrene, p-chlorostyrene, 2,4-dichlorostyrene, and the like. Alkyl esters of acrylic and methacrylic acid, e.g., methyl, ethyl or butyl acrylate, methyl methacrylate, and the like, may also be employed. In addition, one may also use aliphatic vinyl esters such as vinyl acetate, vinyl butyrate, vinyl laurate, acrylonitrile, methacrylonitrile, vinyl chloride, and the like. Further, acrylamide, methacrylamide and their derivatives may be employed. Still further, one can make use of the allyl compounds such as diallyl phthalate, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methyl gluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylenetetrahydrophthalic anhydride, triallyl tricarballylate, triallyltrimesate, triallyl aconitate, triallyl cyanurate, triallyl citrate, triallyl phosphate, trimethallyl phosphate, tetraallyl silane, tetraalyl silicate, hexallyl disiloxane and the like. These polymerizable, ethylenically unsaturated monomeric cross-linking agents may be used singly or in combination with one another.

Other suitable monomers would be apparent to those skilled in the art. The preferred ethylenically unsaturated monomer would be styrene.

The modified polyolefin is then mixed with suitable polyesters in the formation of bulk or sheet molding compositions. The polyester resins are generally condensation products of dicarboxylic acids and polyhyric alcohols. These are preferably unsaturated polyester resins. The unsaturated polyester can be produced by any known method including the solution method, the melting method, or the epoxy method.

Unsaturated dicarboxylic acids suitable in forming the preferred unsaturated polyesters include, but are not limited to, maleic acid, fumaric acid, itaconic acid, citraconic acid, chloromaleic acid, teraconic acid, glutaconic acid, mesaconic acid, and additional amounts of allylmalonic acid, propylidenemalonic acid, hydromuconic acid, succinic acid, carbocaprolactic acid, oxalic acid, malonic acid, citric acid, ethylmalonic acid, 4 amyl-2,5-heptadienedioic acid, 3-hexyne-2,5-dionic acid, tetrahydromethalic acid, 3-carboxy sebacic acid, adipic acid, methylsuccinic acid, isophthalic acid, and the like. Of course, the acid anhydrides of any of the previously listed acids can be used per se or in an admixture with the acid to produce the unsaturated polyesters in accordance with the invention. The reaction employs alpha, beta ethylenically unsaturated polycarboxylic acids and their mixtures or other polymerizable carboxylic acids. If non-alphabeta-polymerizable polycarboxylic acids are employed, they are normally employed in conjunction with the $\alpha$, $\beta$-ethylenically unsaturated polymerizable carboxylic acids in an amount up to 80%. The above list is non-exhaustive, and is only meant to be illustrative. Other suitable acids or anhydrides would be readily apparent to those skilled in the art.

Suitable saturated alcohols would include dihydric or polyhydric alcohols such as 1,2 propane diol, dipropylene glycol, ethylene glycol, diethylene glycol, 1,3 butanediol, 1,4-butanediol, neopentyl glycol, triethylene glycol, tripropylene glycol, pentanediol, glycerol, and the like and mixtures thereof.

The polyester resins employable in accordance with the invention are not limited to those described above and any suitable polyester resin could be employable with the novel low profile additive. For example, those polyesters described in U.S. Pat. Nos. 3,718,714; 3,701,748, 3,880,950; and 4,096,107, the disclosures of which are incorporated by reference, are employable in accordance with the present invention.

The unsatuated polyesters are suitably dissolved in an unsaturated monomer such as those described as dissolving the low profile additive. The dissolution of the polyester in the solvent monomer is accompanied by the dissolution of the low profile additive in the same or a miscible solvent compatible with the crosslinking of the polyester. The mixture solution formed from the polyester solution and the low profile additive solution are such that they form a clear solution. The polyester and the low profile additives are miscible or compatible with each other so as not to form a dispersion. As stated in reference to the low profile additive in accordance with the invention, styrene would be the preferred monomer. However, any monomer could be employable which would suitably be a crosslinking agent with the polyester during the molding of the composition into a thermoset matrix. An advantage of the invention low profile additive is that it is completely compatible with the polyester resin in solution so as to form a clear solution. This homogeneous solution results in superior shrinkage reduction.

The polyester resin and the low profile additive are admixed in the presence of a suitable initiator or curing agent. Suitable initiators would be free radical sources such as organic peroxide, organic hydroperoxide, and azo compounds. Azo peroxide initiators are described by, for example, Gallagher et al in "Organic Peroxides Review, Plastics Design Processing", July 1978, pages 38–42 and August, 1978, pages 60–67, inclusive. The technologies disclosed in these two articles are incorporated by reference. Exemplary hydroperoxides include tert butyl hydroperoxide, cumyl hydroperoxide, 2,5-dimethyl-2,5-dihydroperoxyhexane, p-methanhydroperoxide and isopropylbenzenhydroproxide. Examples of azo compounds which can be used in the composition of this invention include diazoaminobenzene, N,N'-dichloroazodicarboxylic acid amide, diethylazodicarboxylate, 1-cyano-(tert-butylazo)cyclohexanone and azobis(isobutyronitrile). Suitable conventional peroxides employable are benzoylperoxide, di-tert-butyl peroxide, cumene hydroperoxide, tert-butyl perbenzoate, parachlorobenzoyl peroxide, and the like. Generally, any suitable initiator curing agent may be employed in accordance with the invention such as those disclosed in U.S. Pat. Nos. 4,487,798 and 4,329,438, the substance of which are incorporated herein by reference. These initiators are all of the type which function to generate free radicals.

In the practice of the invention the amount of carboxyl modified olefinic copolymer which may be used as a low profile additive can typically vary, but is not limited to, between about 1% to about 10% by weight of the total filled reinforced BMC or SMC molding composition. The type of free radical initiator and the amount to be used will depend on many variables such as type of part which is molded, the type and amounts of polyester resin, and whether other ingredients such as fillers, fiber reinforcement and other additive ingredients are called for by a specific application.

For example, in addition to the polyester resin and the carboxyl modified olefinic copolymer additive, also employable are suitable fillers which are selected from granular fillers such as calcium carbonate, calcium silicate, silica, calcined clay, chalk, talc, limestone, anhydrous calcium sulfate, barium sulfate, asbestos, glass, quartz, aluminum hydrate, aluminum oxide and antimony oxide.

Also, fibrous reinforcement agents can be used which are suitably selected, for example, from the group comprising fibrous glass, metals, silicates, asbestos, cellulose, carbon, graphite, polyesters, polyacryls, polyamides, polyolefins, cotton, hemp, flax, wood, paper, and the like. The preferred fiber is glass. The fibers can be used in forms such as mats, fabrics, threads, chopped fiber and the like. Usually the other ingredients of the SMC or BMC must be mixed first. The initial mixture is then spread upon a film backing which moves through a glass chopping machie where the fiber strands are deposited typically in one inch links. Subsequently, more paste and a cover film is applied and the finished sheet is rolled up for storage until needed for molding. Other suitable additives are colorants or pigments such as titanium dioxide, carbon black, phthalocyanine pigments and the like.

Suitable thickeners can also be employed in the SMC and BMC mixtures in accordance with the invention, which include oxides and hydroxides of the metals of Group IIA of the periodic table, which include magnesium, calcium, strontium, barium and zinc. Preferred are magnesium and/or calcium. These thickening agents promote the SMC or BMC to become essentially tack free and easy to handle, and increase the viscosity thereof. Such high viscosity carries the glass fiber reinforcements to the edge of the mold during the molding process, which is generally very desirable to have a uniform and high strength product.

In suitable cases there may be a desire to inhibit the curing of the SMC or BMC which contains the low profile additive, in which case it would be desirable to employ a polymerization inhibitor. The polymerization inhibitor would retard the entire polymerization reaction and effect stabilization of the composition during any storage period prior to curing. The effect of the inhibitor could effectively be negated by the addition of more polymerization catalyst or initiator or by accelerating the reaction by other means such as heating or irradiation. Possible inhibitors include phenols, monoalkyl phenols, polyalkyl phenols having a plurality of the same or different substitutents, e.g, ethyl, propyl, butyl and higher alkyl radicals attached to their nuclei; hydroquinone, tertiary butyl hydroquinone, and the like. The amount of polymerization inhibitor employed depends on the nature of the polyester resin as well as the storage stability duration required.

Additional additives employed are mold lubricants and release agents such as zinc stearate, and ultraviolet light absorbers and stabilizers such as barium or cadmium soap, phosphates such as dimethylphosphate, alkyl phenols such as BHT, quinones, amines and the like.

An exemplary SMC molding composition and its constituents, in accordance with the invention, is presented below in Table I.

TABLE I

|  | Parts by Weight |
| --- | --- |
| Unsaturated polyester (60% solution in styrene) | 20.0 |
| Low profile additive (40% solution in styrene) | 12.0 |
| Initiator | 0.5 |
| Particulate filler | 56.6 |
| Mold release agent | 0.6 |
| Fiber reinforcement | 10.0 |
| Thickening agent | 0.3 |
|  | 100.0 |

The SMC or BMC paste may incorporate any of the above described additives by additive mixing means found in the art. The mixing method is not critical as compared to conventional mixing techniques employed for conventional low profile additives and other additives into a polyester resin. This is due to the liquid nature and low viscosity of the low profile additives employed in according with the invention. The various additives are easily dispersed and incorporated into the SMC or BMC paste by conventional rotary mixers, varius blenders or extruders or similar equipment. In mixing the SMC or BMC molding composition, care must be taken so as to not overheat the mixture by shear or otherwise, due to the presence of the free radical initiator and the reactive monomers.

The low profile additive is generally employed so as to constitute 1 to 10% by weight of the total filled, reinforced SMC composition as specifically exemplified in Table I. The amount of low profile additive is preferably 4 to 6% by weight of the reinforced SMC.

Generally, the low profile additive is present in an amount ranging from about 5 to about 100 parts per 100 parts of the polyester resin. Preferably, about 30 to about 50 parts per 100 parts of polyester resin are employed.

In the subsequent molding operations of the SMC and BMC compositions employing the novel low profile additive of the invention, the molding composition has handling characteristics which are comparable to conventional SMC and BMC compositions. Therefore, the novel molding compositions require no special handling requirements as compared to conventional low profile additive containing compositions. All the conventional operations which are performed on conventional SMC and BMC compositions are equally applicable to SMC and BMC compositions as modified by the novel low profile additive. The molding conditions are determined mainly by the properties of the polyester resin and the initiator and by special requirements relating to the size and/or shape of the particular part being formed.

In laboratory testing, small flat SMC plaques were molded by typical molding techniques and conditions as is exemplified in the specific examples set forth below. These examples are provided to be merely illustrative of the present invention, however, and are not meant to be limitative.

EXAMPLES 1 TO 3

Examples 1 to 3 show the effect of increasing carboxyl modification of ethylene-propylene copolymer on mold shrinkage and surface appearance in a sheet molding compound.

The copolymer of Example 1 contains no carboxyl functionality, and is therefore not an effective low profile additive. By contrast, the carboxyl modified copolymers of Examples 2 and 3 are increasingly effective. The latter two modified copolymers were prepared by loading together into a 600 ml. pressure reactor 100 g. of liquid ethylene-propylene copolymer (average molecular weight 3200, ethylene to propylene ratio of 50:50 by weight, intrinsic viscosity 0.15 dl/g., iodine number approximately 1), 1.0 g. of dicumyl peroxide, and from 1 to 3 g. of maleic anhydride. The reactor was closed, flushed with nitrogen gas, and heated to 150°–170° C. for 2 hours with stirring. The reactor was then cooled to room temperature (R.T.), opened, and approximately 500 ml. of n-hexane added, and the contents were stirred to dissolve the polymer. Subsequently, the contents of the reactor were combined with 1000 ml of acetone, stirred, and decanted. This acetone wash was repeated two more times. The hexane layer, containing the polymer, was then placed under vacuum at 70° C. for approximately 6 hours. The purified, devolatilized polymer, being now a carboxyl modified ethylene-propylene copolymer, was analyzed by titration for carboxyl content, and dissolved in styrene monomer for use in sheet molding compound. The ratio of copolymer to styrene was 40:60 by weight. The non-carboxyl modified copolymer (Example 1) was similarly dissolved in styrene.

Model sheet molding compounds (omitting glass fiber) were prepared by stirring together at room temperature in a one quart Waring Blender: 75 g. of polyester resin (Aropol Q-6585), 49 g of the polymer solution from above, 1.9 g. of t-butyl perbenzoate, 225 g. of calcium carbonate (Atomite), 5 g of zinc stearate and 1.9 g of magnesium hydroxide. The homogeneous paste was stored in a closed container for 3 days at room temperature, after which it was placed in an 8×8×⅛ inch mold and cured at approximately 280° F. for 20 minutes at a pressure of approximately 350 lbs. per square inch. The mold was opened while hot, and the sample plaque was removed. Mold and plaque were allowed to cool to room temperature, and their dimensions measured with a vernier caliper.

Table II shows the effect of increasing maleic anhydride (MA) level of the adduct on dimensional change and surface smoothness of the SMC plaques. Negative dimensional change indicates net shrinkage, and positive change indicates expansion, of the room temperature plaque relative to the room temperature mold.

TABLE II

| Use of 3200 Molecular Weight E-P Copolymer in SMC | | | |
|---|---|---|---|
| Example No. | MA Level, % | Dimension Change, mils/inch | Surface Smoothness |
| 1 | 0 | −3.1 | poor |
| 2 | 0.7 | +0.4 | fair |
| 3 | 1.6 | +0.5 | good |

EXAMPLES 4 TO 8

These examples illustrate the optimum molecular weight range of carboxyl modified olefinic copolymer (adduct) in controlling SMC shrinkage and improved surface smoothness. The modified copolymers of these examples, and the model sheet molding compounds, were prepared by procedures very similar to those outlined in the previous two examples, except that the starting ethylene-propylene copolymer had an average molecular weight of 4600, ethylene to propylene ratio of 49:51 by weight, and possessed at least about 75% vinylidene terminal groups, and that the initiator was di-t-butyl peroxide, the reaction was carried out at 150° C. for 3 hours, the acetone wash steps were omitted, and the test plaque dimensions were 6×6×¼ inch. The variations in the molecular weight of the adduct were achieved by varying the level of peroxide.

In Table III, Examples 5, 6, and 7 fall within the optimum molecular weight range for best shrinkage control. Examples 4 and 8 are on the low and high side, respectively, of this optimum range. The surface smoothness of Example 8, however, is still very good, even though shrinkage control is slightly less than optimal. This latter effect was pointed out in the foregoing discussion.

TABLE III

| Example No. | Peroxide Level* | Adduct Molecular Weight** | Dimensional Change mils/inch | Surface Smoothness |
|---|---|---|---|---|
| 4 | 0 | 4,170 *** | −5.2 | poor |
| 5 | 0.07 | 5,490 | −1.7 | v. good |
| 6 | 0.33 | 7,660 | +0.1 | v. good |
| 7 | 0.50 | 9,070 | +0.3 | v. good |
| 8 | 0.70 | 11,930 | −0.3 | v. good |

*Parts of di-t-butyl peroxide per hundred parts of E-p copolymer, by weight.
**Number average.
***Equivalent to 4600, unchanged from starting value, within limits of experimental error.

EXAMPLES 9 AND 10

These two examples illustrate the use of two ethylenepropylene copolymers of differing molecular weights to produce carboxyl modified adducts which have similar molecular weights. When incorporated into a sheet molding compound, both adducts give essentially the same degree of shrinkage control and surface improvement. In Example 9, ethylene-propylene copolymer was used having an average molecular weight of 4600, being the same copolymer that was described above in Examples 4 to 8. In Example 10, ethylene-propylene copolymer was used having an averge molecular weight of 3000, ethylene to propylene ratio of 58:42 by weight, and containing at least approximately 60% vinylidene termination in the copolymer chains.

The reaction to produce carboxyl modified adduct from each copolymer was done in a 1-liter pressure reactor, with constant stirring at 150° C. for 3 hours.

The amount of maleic anhydride used in each case was 6 parts by weight, relative to 100 parts of copolymer. The initiator in each example was di-t-butyl peroxide, but differing amounts were used, as shown in Table IV below, to obtain similar molecular weights (in the 9000 to 10,000 range) in the final adducts. The general procedures for carrying out the carboxylation and preparing the sheet molding compounds of Example 9 and 10 were the same as for Example 4 through 8.

TABLE IV

| Example No. | Initiator Level* | Initial MW** | Adduct MW** | Dimensional Change*** Mils/Inch | Surface Smoothness |
|---|---|---|---|---|---|
| 9 | 0.5 | 4600 | 9,070 | +0.3 | v. good |
| 10 | 0.8 | 3000 | 10,290 | +0.2 | v. good |

*Parts of di-t-butyl peroxide per hundred parts of copolymer by weight.
**Number average molecular weight.
***Measured on room temperature cured sheet molding compound sample plaque, 6 × 6 × ¼ inches, relative to mold cavity at room temperature.

These two examples demonstrate a surprising feature of our invention, i.e., that considerable latitude can be allowed in the initial average molecular weight of the olefinic polymer, but when the conditions of the carboxyl modification reaction are tailored so as to bring the average molecular weight of the adduct into the optimum range (from about 5000 to about 14,000) then optimum performance in shrinkage and surface properties is obtained. The specific tailored reaction conditions for a particular starting polymer can be readily determined by first empirically determining the molecular weight increase vs. initiator level for two or three base points, thereby establishing a curve from which the resulting adduct molecular weight for a given initiator level can be predicted with a good degree of certainty.

EXAMPLES 11 TO 14

These examples show the use of ethylene-propylene-nonconjugated polyene terpolymer (EPDM, Ex. 11), and the use of a dicarboxylic anhydride (Ex. 12) in the practice of the present invention. The use of a commercially available low profile additive (Ex. 13) is included for comparison purposes.

The terpolymer of Example 11 was made from the monomers ethylene and propylene in the ratio of approximately 50:50 by weight, and included dicyclopentadiene as the termonomer in an amount such that the iodine number of the polymer was approximately 19. This terpolymer had an average molecular weight of about 6500.

A 300 g. sample of the EPDM terpolymer was placed in a 1 liter pressure reactor with 21 g. of maleic anhydride, and stirred at 160° C. for 4 hours. The reactor was cooled to 80° C., and 300 ml. of n-hexane were added with stirring. Two successive extractions with 1000 ml. of acetone each were carried out, and the product was placed in a vacuum oven at 50° C. overnight.

Example 11 further demonstrates that the initiator can be omitted when using a fairly reactive polymer, such as EPDM, and the desired carboxyl modification is obtained merely by heating the reagents together as described above.

In Example 12, the same ethylene-propylene copolymer was used as described above in Examples 1 to 3, and the carboxyl modification was done by reacting this copolymer with 5-(2,5-dioxotetrahydrofuryl)-3-methyl-3-cyclohexene-1,2-dicarboxylic anhydride (trade name Epiclon B-4400) in the presence of di-t-butyl peroxide at 165° C. for 3 hours. The ratios of copolymer to anhydride to peroxide were 150 to 16 to 3, respectively, by weight. The reaction product was purified by vacuum devolatilization at 125° C., and acetone extraction.

The low profile additive of Example 13 was Neulon T, available from Union Carbide Corp., which is available as a solution containing about 54% styrene. The active ingredient is a proprietary poly (vinyl acetate) mixture. Neulon T is included for purposes of comparison to the other examples herein. Neulon T is known in the sheet molding compound industry as an excellent low profile additive. Since Example 13 is a direct comparison of this additive to the compositions of the present invention, and uses the same SMC recipe and test conditions, it serves to demonstrate that the additives of the present invention, when used in the preferred optimum range of the invention, are superior to Neulon T in terms of SMC shrinkage control. Surface smoothness likewise, in the majority of examples, is comparable to or better than that obtained with Neulon T.

Example 14 is included for comparison to show the dimensional change which results when no low profile additive at al is used in the SMC. In Example 14, the same recipe and procedure as in Examples 1 to 3 was used, except that the amount of polyester resin was increased relative to the other ingredients to compensate for the fact that no low profile additive was included. In this way the concentrations of filler, initiator, and other recipe components were kept constant in relation to the other Examples shown herein, so that a valid and direct comparison of shrinkage can be made.

The test plaque of Example 14 shrank 18.0 mils/inch, and the surface contained large cracks and pits. This example constitutes a control case to which the relative performance of the other examples can be compared.

Model sheet molding compounds for Examples 11 to 14 were prepared by the same procedure as in Examples 1 to 3. The SMC test plaque dimensions were 8×8×⅛ inches.

TABLE V

| Example No. | Polymer Used | Dimension Change mils/inch | Surface Smoothness |
|---|---|---|---|
| 11 | EPDM/MA | +0.8 | good |
| 12 | EP/EPICLON | +0.1 | good |
| 13 | NEULON T | +0.1 | good |
| 14 | None | −18.0 | v. v. poor |

Other embodiments of the present invention will be apparent to those skilled in the art from a consideration of this specification or practice of the invention disclosed herein. It is intended that the specification of this application and the examples be considered as exemplary with the true scope and spirit of the invention being indicated by the following claims.

We claim:

1. A non-thermoplastic carboxyl modified polyolefin copolymer comprising the reaction product of
   a. an ethylene/alphaolefin copolymer having a number average molecular weight ranging from 250 to 15,000 with vinylidene termination unsaturation on at least 50% of the copolymer chains, wherein the alphaolefin has the formula $H_2C=CHR$, wherein R is an alkyl radical having 1 to 10 carbon atoms, and
   b. an unsaturated carboxylic acid or anhydride containing three or more carbon atoms and at least one carboxyl group.

2. The carboxyl modified polyolefin of claim 1, wherein the ethylene/alphaolefin copolymer further comprises a non-conjugated polyene to form a terpolymer.

3. The carboxyl modified polyolefin of claim 1, wherein the ethylene/alphaolefin copolymer was an intrinsic viscosity of 0.025 to 0.55 dl/g.

4. The carboxyl modified polyolefin of claim 1, wherein the ethylene content is in the range of 30% to 70% by weight.

5. The carboxyl modified polyolefin of claim 2, wherein the terpolymer has an ethylene content of 30 to 70% by weight, the non-conjugated polyene content of 6 to 25% by weight, with the balance alphaolefin.

6. The carboxyl modified polyolefin of claim 1, wherein the number average molecular weight of the ethylene/alphaolefin copolymer is between 3,000 and 10,000.

7. The carboxyl modified polyolefin of claim 1, wherein the alphaolefin is propylene.

8. The carboxyl modified polyolefin of claim 2 wherein the non-conjugated polyene is 5-ethylidene-2-norbornene, 1,4-hexadiene, or dicyclopentadiene.

9. The carboxyl modified polyolefin of claim 1, wherein the anhydride is maleic.

10. The carboxyl modified polyolefin of claim 1 wherein 0.1 to 10 weight percent of the polyolefin are carboxyl groups.

* * * * *